United States Patent
Ilan et al.

(10) Patent No.: US 6,195,638 B1
(45) Date of Patent: Feb. 27, 2001

(54) PATTERN RECOGNITION SYSTEM

(75) Inventors: Gabriel Ilan, Tel-Aviv; Jacob Goldberger, Givatayim, both of (IL)

(73) Assignee: Art-Advanced Recognition Technologies Inc., Chatsworth, CA (US)

(*) Notice: Subject to any disclaimer, the term of this patent is extended or adjusted under 35 U.S.C. 154(b) by 0 days.

(21) Appl. No.: 09/145,679

(22) Filed: Sep. 2, 1998

Related U.S. Application Data

(63) Continuation-in-part of application No. 08/625,651, filed on Mar. 29, 1996, now Pat. No. 5,809,465.

(30) Foreign Application Priority Data

Mar. 30, 1995 (IL) ........................................ 113204

(51) Int. Cl.[7] ........................................ G10L 3/02
(52) U.S. Cl. ............................................ 704/241
(58) Field of Search .................................. 704/241, 231, 704/236; 382/215, 209, 109

(56) References Cited

U.S. PATENT DOCUMENTS

| | | | |
|---|---|---|---|
| 4,467,437 | * 8/1984 | Tsuruta et al. | 704/241 |
| 4,488,243 | * 12/1984 | Brown et al. | 704/241 |
| 4,592,086 | * 5/1986 | Watari et al. | 704/238 |
| 4,910,783 | * 3/1990 | Nakagawa | 704/241 |
| 4,918,733 | * 4/1990 | Daugherty | 704/241 |
| 5,121,465 | * 6/1992 | Sakoe | 704/236 |
| 5,459,798 | * 10/1995 | Bailey et al. | 382/218 |
| 5,640,466 | * 6/1997 | Huttenlocher et al. | 382/177 |
| 5,682,464 | * 10/1997 | Sejnoha | 704/238 |

OTHER PUBLICATIONS

"Dynamic Progremming Algorithm Optimization for Spoken Word Recognition", by Sakoe and Chiba, IEEE Transactions on Acoustics. Speech and Signal Processing, Feb. 1978.

"Cepstral Analysis Techniques for Automatic Speaker Verification", by Furi, IEEE Transactions on Acoustics. Speech and Signal Processing, Apr. 1981.

"A Weighted Cepstral Distance Measure for Speech Recognition", by Tahkure, IEEE Transactions on Acoustics. Speech and Signal Processing, Oct. 1987.

* cited by examiner

Primary Examiner—Krista Zele
Assistant Examiner—Michael N. Opsasnick
(74) Attorney, Agent, or Firm—Fenster & Company Patent Attorneys Ltd.

(57) ABSTRACT

A pattern recognition method of dynamic time warping of two sequences of feature sets onto each other is provided. The method includes the steps of creating a rectangular graph having the two sequences on its two axes, defining a swath of width r, where r is an odd number, centered about a diagonal line connecting the beginning point at the bottom left of the rectangle to the endpoint at the top right of the rectangle and also defining r−1 lines within the swath. The lines defining the swath are parallel to the diagonal line. Each array element k of an r-sized array is associated with a separate array of the r lines within the swath and for each row of the rectangle, the dynamic time warping method recursively generates new path values for each array element k as a function of the previous value of the array element k and of at least one of the current values of the two neighboring array elements k−1 and k+1 of the array element k. The latter step of recursively generating new path values is repeated for all of the rows of the rectangle and the value of the middle array element is selected as the output value sought.

30 Claims, 5 Drawing Sheets

PATTERN RECOGNITION SYSTEM

RELATED APPLICATION

The present application is a continuation-in-part of U.S. patent application Ser. No. 08/625,651, filed on Mar. 29, 1996 now U.S. Pat. No. 5,809,465, the disclosure of which is incorporated herein by reference.

FIELD OF THE INVENTION

The present invention relates generally relates to pattern recognition systems, and in particular, to pattern recognition systems using a weighted cepstral distance measure.

BACKGROUND OF THE INVENTION

Pattern recognition systems are used, for example, for the recognition of characters and speech patterns.

Pattern recognition systems are known which are based on matching the pattern being tested against a reference database of pattern templates. The spectral distance between the test pattern and the database of reference patterns is measured and the reference pattern having the closest spectral distance to the test pattern is chosen as the recognized pattern.

An example of the prior art pattern recognition system using a distance measure calculation is shown in FIGS. 1, 2 and 3, to which reference is now made. FIG. 1 is a flow chart illustrating the prior art pattern recognition system for speech patterns using a conventional linear predictor coefficient (LPC) determiner and a distance calculator via dynamic time warping (DTW). FIG. 2 illustrates the relationship between two speech patterns A and B, along i-axis and j-axis, respectively. FIG. 3 illustrates the relationship between two successive points of pattern matching between speech patterns A and B.

Referring to FIG. 1, the audio signal 10 being analyzed, has within it a plurality of speech patterns. Audio signal 10 is digitized by an analog/digital converter 12 and the end-points of each speech pattern are detected by a detector 14. The digital signal of each speech pattern is broken into frames and for each frame, analyzer 16 computes the linear predictor coefficients (LPC) and converts them to cepstrum coefficients, which are the feature vectors of the test pattern. Reference patterns, which have been prepared as templates, are stored in a database 18. A spectral distance calculator 20 uses a dynamic time warping (DTW) method to compare the test pattern to each of the reference patterns stored in database 18. The DTW method measures the local spectral distance between the test pattern and the reference pattern, using a suitable method of measuring spectral distance, such as the Euclidean distance between the cepstral coefficients or the weighted cepstral distance measure. The template whose reference pattern is closest in distance to the analyzed speech pattern, is then selected as being the recognized speech pattern.

In a paper, entitled "Dynamic Programming Algorithm Optimization for Spoken Word Recognition", published by the *IEEE Transactions on Acoustics, Speech and Signal Processing* in February 1978, Sakoe and Chiba reported on a dynamic programming (DP) based algorithm for recognizing spoken words. DP techniques are known to be an efficient way of matching speech patterns. Sakoe and Chiba introduced the technique known as "slope constraint", wherein the warping function slope is restricted so as to discriminate between words in different categories.

Numerous spectral distance measures have been proposed including the Euclidean distance between cepstral coefficients which is widely used with LPC-derived cepstral coefficients. Furui in a paper, entitled "Cepstral Analysis Techniques for Automatic Speaker Verification", published by the *IEEE Transactions on Acoustics, Speech and Signal Processing* in April 1981, proposed a weighted cepstral distance measure which further reduces the percentage of errors in recognition.

In a paper, entitled "A Weighted Cepstral Distance Measure for Speech Recognition", published by the *IEEE Transactions on Acoustics, Speech and Signal Processing* in October 1987, Tahkura proposed an improved weighted cepstral distance measure as a means to improve the speech recognition rate.

Referring now to FIG. 2, the operation of the DTW method will be explained. In FIG. 2, speech patterns A and B are shown along the i-axis and j-axis, respectively. Speech patterns A and B are expressed as a sequence of feature vectors $a_1, a_2, a_3 \ldots a_m$ and $b_1, b_2, b_3 \ldots b_m$, respectively.

The timing differences between two speech patterns A and B, can be depicted by a series of 'points' Ck(i,j). A 'point' refers to the intersection of a frame i from pattern A to a frame j of pattern B. The sequence of points C1, C2, C3 ... Ck represent a warping function 30 which effects a map from the time axis of pattern A, having a length m, on to the time axis of pattern B, having a length n. In the example of FIG. 2, function 30 is represented by points c1(1,1), c2(1,2), c3(2,2), c4(3,3), c5(4,3) ... ck(n,m). Where timing differences do not exist between speech patterns A and B, function 30 coincides with the 45 degree diagonal line (j=i). The greater the timing differences, the further function 30 deviates from the 45 degree diagonal line.

Since function 30 is a model of time axis fluctuations in a speech pattern, it must abide by certain physical conditions. Function 30 can only advance forward and cannot move backwards and the patterns must advance together. These restrictions can be expressed by the following relationships:

$$i(k)-i(k-1)\leq 1 \text{ and } (j(k)-j(k-1)\leq 1; \text{ and } i(k-1)\leq i(k) \text{ and } j(k-1)\leq j(k). \quad (1)$$

Warping function 30 moves one step at a time from one of three possible directions. For example, to move from C3(2,2) to C4(3,3), function 30 can either move directly in one step from (2,2) to (3,3) or indirectly via the points at (2,3) or (3,2).

Function 30 is further restricted to remain within a swath 32 having a width r. The outer borders 34 and 36 of swath 32 are defined by (j=i+r) and (j=i−r), respectively.

A fourth boundary condition is defined by:

$$i(1)=1, j(1)=1, \text{ and } i(end)=m, j(end)=n. \quad (2)$$

Referring now to FIG. 3, where, for example, the relationship between successive points $C10_{(10,10)}$ and $C11_{(11,11)}$, of pattern matching between speech patterns A and B is illustrated. In accordance with the conditions as described hereinbefore, there are three possible ways to arrive at point $C11_{(11,11)}$, that is, either directly from $C10_{(10,10)}$ to $C11_{(11,11)}$, indicated by line 38 or from $C10_{(10,10)}$ via point $(_{11,10})$ to $C11_{(11,11)}$, indicated by lines 40 and 42, or thirdly from $C10_{(10,10)}$ via point $(_{10,11})$ to $C11_{(11,11)}$, indicated by lines 44 and 46.

Furthermore, associated with each arrival point (i,j), such as point $C11_{(11,11)}$, is a weight $W_{ij}$, such as the Euclidean or Cepstral distance between the ith frame of pattern A and the jth frame of pattern B. By applying a weight $W_{ij}$ to each of indirect paths 40, 42, 44 and 46 and a weight of $2W_{ij}$ to direct path 38, the path value $S_{ij}$, at the point (ij) can be recursively ascertained from the equation:

$$S_{ij} = \min \begin{array}{l} 2W_{ij} + S_{i-1,j-1}, \\ W_{ij} + S_{i,j-1}, \\ W_{ij} + S_{i-1,j} \end{array} \qquad (3)$$

In order to arrive at endpoint $S_{nm}$, it is necessary to calculate the best path value $S_{ij}$ at each point. Row by row is scanned and the values of $S_{ij}$ for the complete previous row plus the values of the present row up to the present point are stored. The value for Snm is the best path value.

SUMMARY OF THE INVENTION

It is thus the general object of the present invention to provide an improved pattern recognition method, which is especially suitable for voice recognition.

According to the invention there is provided a method of dynamic time warping of two sequences of feature sets onto each other. The method includes the steps of creating a rectangular graph having the two sequences on its two axes, defining a swath of width r, where r is an odd number, centered about a diagonal line connecting the beginning point at the bottom left of the rectangle to the endpoint at the top right of the rectangle and also defining r−1 lines within the swath. The lines defining the swath are parallel to the diagonal line. Each array element k of an r-sized array is associated with a separate array of the r lines within the swath and for each row of the rectangle, the dynamic time warping method recursively generates new path values for each array element k as a function of the previous value of the array element k and of at least one of the current values of the two neighboring array elements k−1 and k+1 of the array element k. The latter step of recursively generating new path values is repeated for all of the rows of the rectangle and the value of the middle array element is selected as the output value sought.

Furthermore, according to the invention there is provided a method of dynamic time warping of two sequences of feature sets onto each other where the first sequence set has a length L1 and the second sequence set has a length L2 and L1 being greater than L2. The method includes the steps of creating a rectangular graph having the first longer sequence on its horizontal axis and the second sequence on its vertical axis, defining a swath of width r, where r is an odd number, centered about a diagonal line connecting the beginning point at the bottom left of the rectangle to the endpoint at the top right of the rectangle and also defining r−1 lines, which are parallel to the diagonal line within the swath. The method further includes the steps of associating each array element k of an r-sized array with a separate array of the r lines within the swath and for each row of the rectangle, recursively generating new path values for each array element k as a function of the previous value of array element k and of at least one of the current values of the two neighboring array elements k−1 and k+1. The latter step is repeated for all of the rows of the rectangle. For every L1/(L1−L2) rows of the rectangle, a new path value for an array element k=max(k)+1 of the array element k is also generated and for each of the array elements k, the new path values are replaced by the value of its neighboring array element k+1. The value of the middle array element is selected as the output value sought.

Furthermore, in accordance with a preferred embodiment of the invention, the step of selecting the output value is replaced by the step of selecting, as output, the smallest value stored in the array elements and the array element number associated therewith.

Furthermore, in accordance with a preferred embodiment of the invention, the feature sets have integer values. Additionally, in accordance with a preferred embodiment of the invention, the step of defining a swath of width r, is replaced by the step of defining a swath connecting the beginning point at the top right of the rectangle to the endpoint at the bottom left of the rectangle.

Furthermore, in accordance with a preferred embodiment of the invention, there is provided a method of pattern recognition including the steps of generating feature sets, having floating points, of a set of reference patterns, normalizing the feature sets by their standard deviations across the set of reference patterns and selecting only the integer portions of the result, storing the portions as integer feature sets for the reference patterns, for every input pattern, generating a feature set and formatting an integer value in accordance with the step normalizing the feature sets by their standard deviations described above and comparing the integer feature sets of the input pattern to at least one of the integer feature sets of the reference patterns.

Additionally, in accordance with a preferred embodiment of the invention, the step of formatting an integer value includes the steps of calculating the average value of the input patterns, calculating the standard deviation of each of the feature sets, dividing each of the feature sets by the calculated standard deviation and multiplying by a factor q and calculating the integer value.

Although the swath may be defined as being a fixed band between corners of the rectangular graph, in some preferred embodiments of the invention the definition of the swath is less limiting. In one such embodiment, the starting point and/or the ending point are not limited to being at a corner of the rectangular graph. Preferably, non-corner starting points are weighted with a positional weighting, to reduce their desirability, however, they are allowed. In a preferred embodiment of the invention, the positional weighing is designed to compensate for the possibility that a path which does not connect two corners is shorter than a path which does. Thus, a path will be selected because it models a desired warping better and not because it is shorter and includes fewer weighted points. Preferably, positionally weighting the end points alleviates the need to backtrack from the end-point to the start point, since any start point is possible, once the positional weighting are taken into account.

Alternatively or additionally, the swath itself is made non-absolute. Preferably, points outside the swath are assigned non-infinite weights so that it is possible to deviate from the path defined by the swath. Alternatively or additionally, the weights of points inside the swath are also modified with a positional weighting, so that a path will tend (barring other considerations, such as sequence matching) to follow a path of least positional weights. This path of least positional weights may, in some cases, be other than a diagonal connecting the two corners. In some embodiments of the invention, this path is not a straight line.

There is therefore provided in accordance with a preferred embodiment of the invention a method of determining a value of lowest-weight path of a mapping between two sequences, comprising:

determining a first mapping wavefront, comprising a plurality of mapping points, each mapping point corresponding to a mapping between one data-point of one sequence of said two sequences and one data-point of another of said two sequences, each mapping point having associated therewith a value;

propagating the wavefront to a second plurality of mapping points;

determining a value associated with each of said second plurality of mapping points, responsive to values associated with said first mapping wavefront and to mapping weights determined by said first plurality of mapping points and by said second plurality of mapping points;

propagating the wavefront to a third plurality of mapping points;

determining a value associated with each of said second plurality of mapping points, responsive to values associated with a previous mapping wavefront and to mapping weights determined by a plurality of mapping points associated with said previous wavefront and by said third plurality of mapping points; and re-propagating the wave front to a fourth plurality of mapping points while retaining in a memory only values of mapping points associated with a limited number of previous wavefronts, where said limited number is significantly smaller than a number of data points in a shorter one of said two sequences.

Preferably, determining a first mapping wave front comprises:

setting up at least one initial mapping point; and propagating a wavefront from said at least one initial mapping point to said first mapping wavefront.

Alternatively or additionally, a mapping weight for determining a value of a mapping point of a current wavefront is a function of a mapping between a portion of one of said sequences and a portion of a second one of said sequences, where said portions are determined by a mapping between said two sequences, which mapping is associated with a pair of mapping points, one in the current wavefront and one in a previous wavefront.

Alternatively or additionally, a value for a mapping point in a current wavefront is determined as a minimum of a sum of a value of a previous mapping point in a previous wavefront and a mapping weight associated with a pair of mapping points comprising the current mapping point and the previous mapping point, where such a sum is determined initially for at least two previous wavefront mapping points for each current wavefront mapping point, providing such two previous points exist.

Preferably, said pairs of mapping points are limited to a subset of all possible pairs, based on distance between mapping points comprising the pairs.

In a preferred embodiment of the invention, said at least one initial point comprises a single initial point. Alternatively, said at least one initial point comprises a plurality of initial points. Preferably, each of said plurality of initial points has a value associated therewith. Preferably, said value is large for initial points which do not represent a mapping between initial datapoints of said two sequences.

In a preferred embodiment of the invention, re-propagating said wavefront comprises re-propagating said wavefront until all datapoints of at least one of said sequences is mapped to datapoints of the other of said sequences, at a last wavefront. Preferably, said last wavefront includes a corner mapping point which maps a final data point of one sequence to a final data point of the other sequence. Preferably, the method comprises selecting a value associated with said corner mapping point as said determined value of a lowest-weight path. Alternatively the method comprises selecting a minimum value, over at least two mapping points in said last wavefront, as said determined value of a lowest-weight path.

In a preferred embodiment of the invention, said values of said mapping points in said last wavefront are a function of said mapping points not being a corner mapping point. Alternatively or additionally, the method comprises weighting said values of said mapping point in said last wavefront, responsive to lengths of paths followed to reach said last wavefront.

In a preferred embodiment of the invention, said second wavefront comprises a set of mapping points, each mapping a same data point of one sequence to different data points of the other sequence. Alternatively, said second wavefront defines a perpendicular, in a Cartesian mapping space, to a mapping line defining a one-to-one mapping between said two sequences.

In a preferred embodiment of the invention, said limited number of previous wavefronts comprises two wavefronts. Alternatively, said limited number of previous wavefronts comprises a single wavefront. Alternatively, said limited number comprises more than two wavefronts, for example three or four.

In a preferred embodiment of the invention, said wavefront propagation is limited to a subset of all possible mapping points. Preferably, mapping points outside said subset of all possible mapping points are associated with infinite values. Alternatively or additionally, a positional weight is associated with individual mapping points. Preferably, said value associated with a mapping point is also a function of said positional weight. Alternatively or additionally, said positional weight is dependent on an absolute position of an individual mapping point, in a Cartesian mapping space of said sequences.

In a preferred embodiment of the invention, said limited subset is defined, in a Cartesian mapping space of said sequences, as a swath having a width r. Preferably, r is an odd integer. Alternatively or additionally, said swath is centered around a diagonal in said Cartesian mapping, connecting a mapping of initial data points of the sequences and a mapping of final data points of the sequences.

In a preferred embodiment of the invention, said two sequences comprise different numbers of data points. Alternatively or additionally, said sequences comprises datapoints having integer values.

BRIEF DESCRIPTION OF THE DRAWINGS

The present invention will be understood and appreciated more fully from the following detailed description taken in conjunction with the accompanying drawings in which.

DETAILED DESCRIPTION OF A PREFERRED EMBODIMENT

Figure 4:
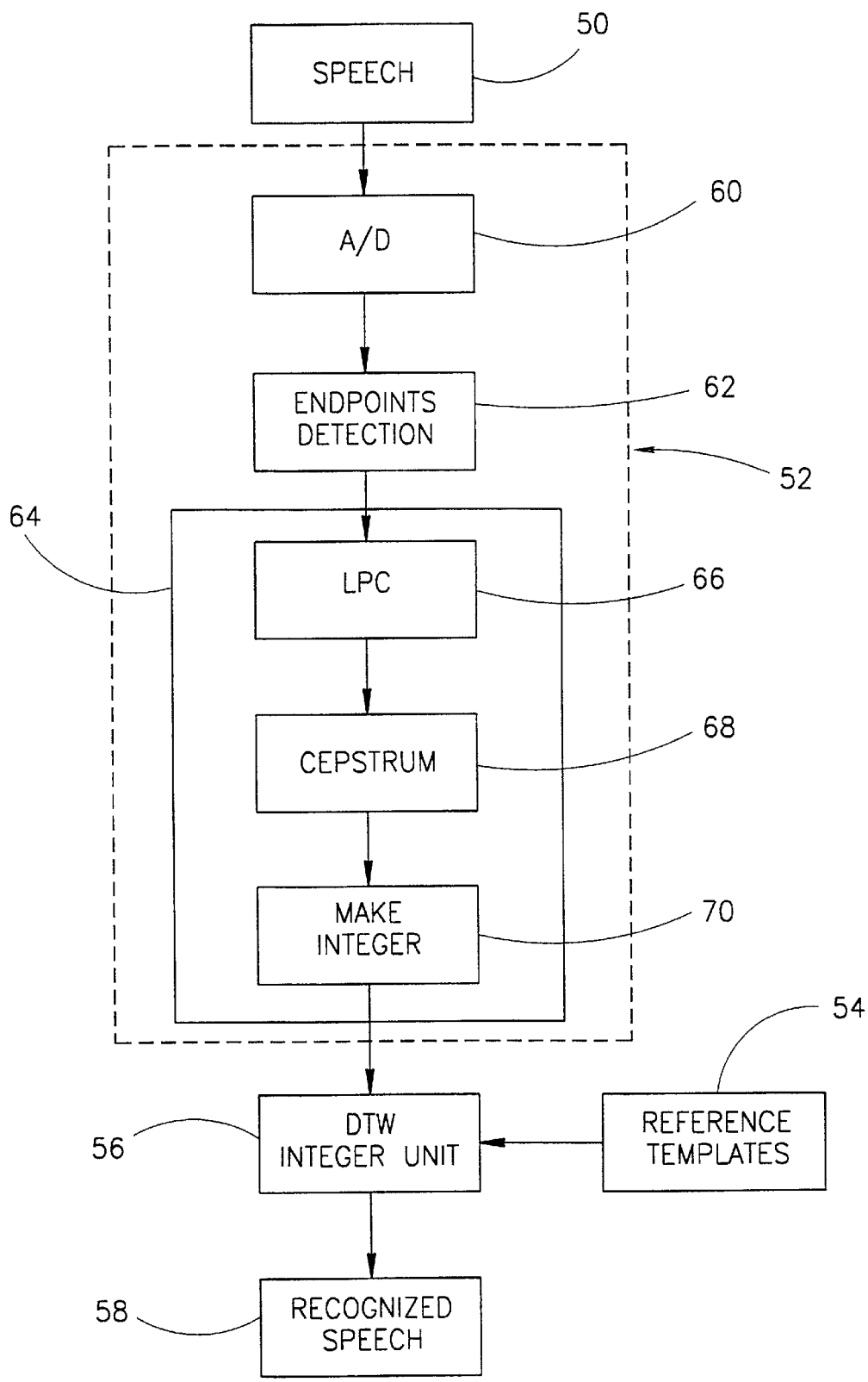
FIG. 4 is a flow chart illustration of a distance fan pattern recognition system, constructed and operative in accordance with a preferred embodiment of the present invention.

Reference is now made to FIG. 4 which is a flow chart representation of the distance pattern recognition system (DPR), constructed and operative in accordance with a preferred embodiment of the present invention. The following description relates to audio or speech patterns, though it should be understood that the present invention is not restricted thereto and can apply to any kind of pattern.

The DPR system converts the audio pattern 50 to be analyzed, into a feature set in an integer format, using a processor, generally designated 52. The integer feature set for the test pattern is then compared with a database 54 containing reference patterns, by measuring the spectral distance between the test pattern and each reference pattern, using dynamic time warping (DTW) by the DTW unit 56. The reference pattern which is closest to the test pattern, is then selected as the recognized speech pattern 58. It should be noted that an integer format often requires less storage space than a floating point format, for a same amount of information. Additionally, operations using integer numbers are generally faster and/or utilize simpler and/or less expensive hardware than floating point operations. Nevertheless, an non-integer format may also be used, in some embodiments of the invention.

Processor 52 digitizes audio pattern 50 using an analog/digital converter 60 and then detects the endpoints of each audio pattern 50 using detector 62. The output is an audio word. Processor 52 breaks the word into frames and then extracts the features of each frame via a feature extractor, generally designated 64. Feature extractor 64 comprises a linear prediction coefficient (LPC) calculator 66, a cepstrum converter 68 and an integer formatter 70. LPC calculator 66 computes the linear prediction coefficients (LPC) for each frame. Cepstrum converter 68 converts the LPC coefficients of each frame into a set of cepstrum coefficients. Finally integer formatter 70 normalizes and converts the cepstrum coefficients of each frame into integer format. The integer coefficients are the feature set of the frame. Database 54 comprises reference patterns, which have been previously prepared, using the process hereinbefore described.

Prior to operation, for each cepstrum coefficient, D1, D2, etc. in the feature sets of the database, integer formatter 70 calculates its average value and the standard deviation. Then, for each cepstrum coefficient in each feature set (whether of the reference database or of an incoming feature set), integer formatter 70 divides each cepstrum coefficient $D_1$ by its associated standard deviation $\sigma_1$, multiplies the result by a factor q and saves the integer portion of the result. The constant q is any number which results in the integer portions for all the cepstrum coefficients being within a range of −100 to +100. Thus, the integer coefficient does not require storage of more than one byte of 8 bits. Using integer formatter 70 enables the full dynamic range of the resolution to be used.

Thus, for example, for five $D_1$ cepstrum coefficients 5.2, −4.0, 5.4, 6.4, and 20, the standard deviation σ is 6.6513. If q=20, dividing each cepstrum coefficient by σ results in values of 15.64, −12.03, 16.23, 19.24 and 60.14, respectively. The integer coefficients are thus 15, −12, 16, 19 and 60, respectively.

Figure 1:
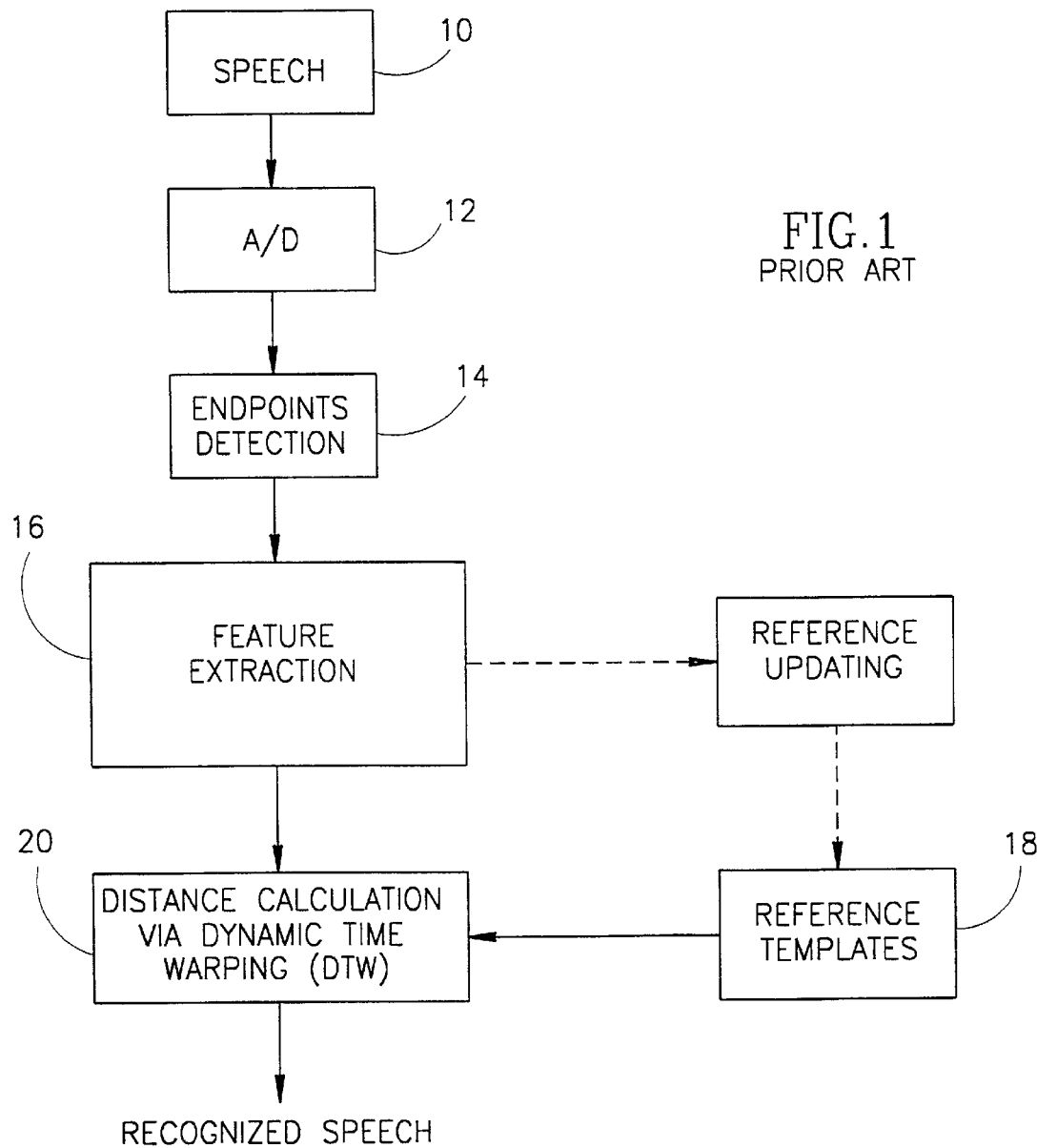
FIG. 1 is a flow chart illustration of a prior art pattern recognition system using a conventional cepstrum coefficients and a distance calculator via dynamic time warping (DTW).
Figure 2:
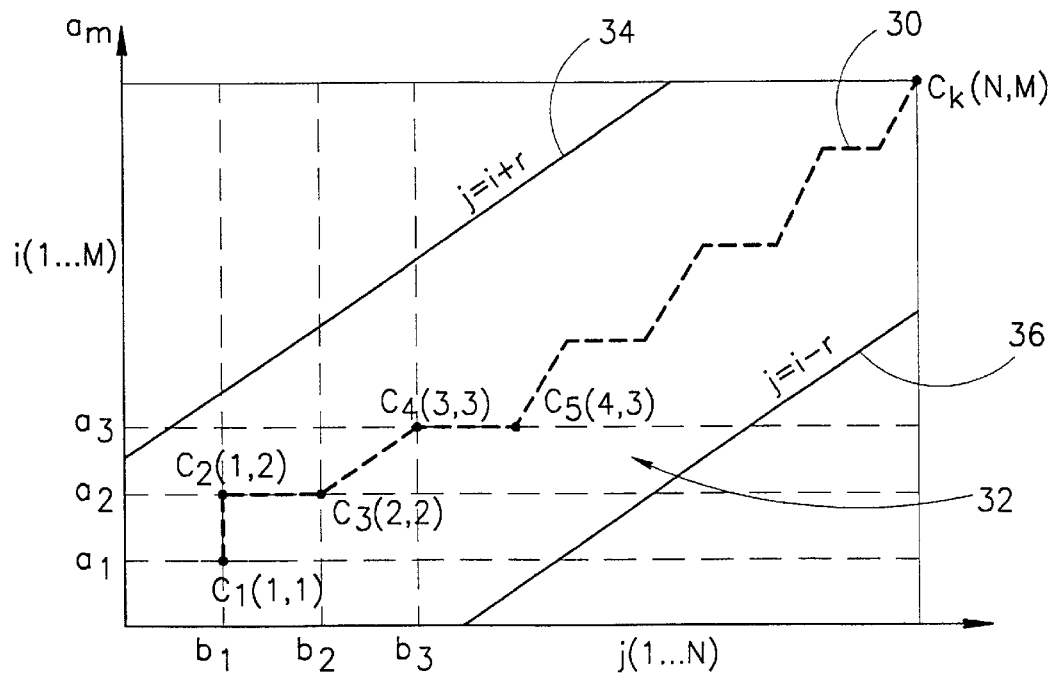
FIG. 2 is a schematic illustration of the relationship between two speech patterns A and B, along i-axis and j-axis, respectively, in accordance with the prior art.
Figure 3:
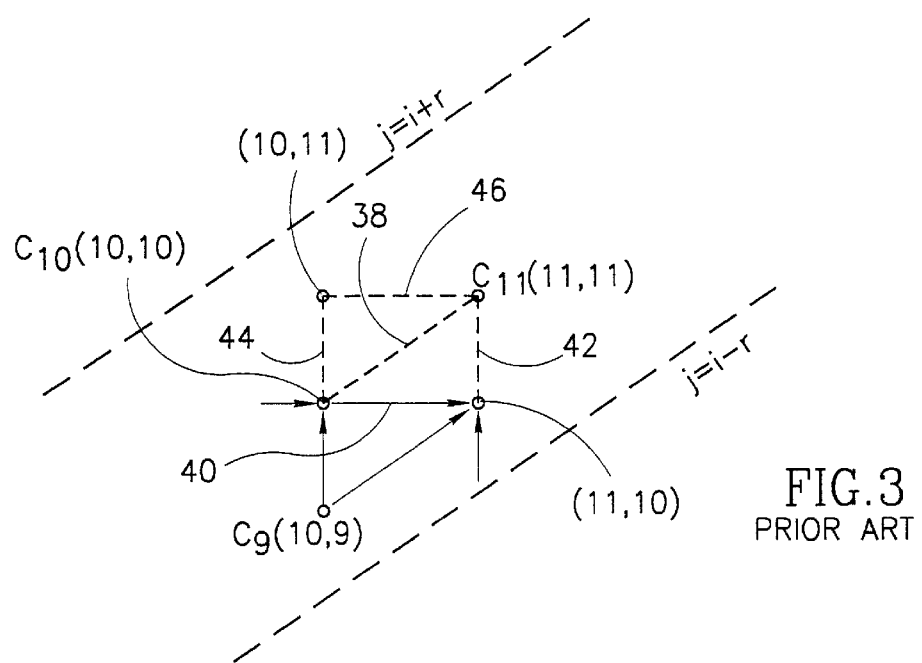
FIG. 3 is a schematic illustration of the relationship between two successive points of pattern matching between the two speech patterns A and B.
Figure 5:
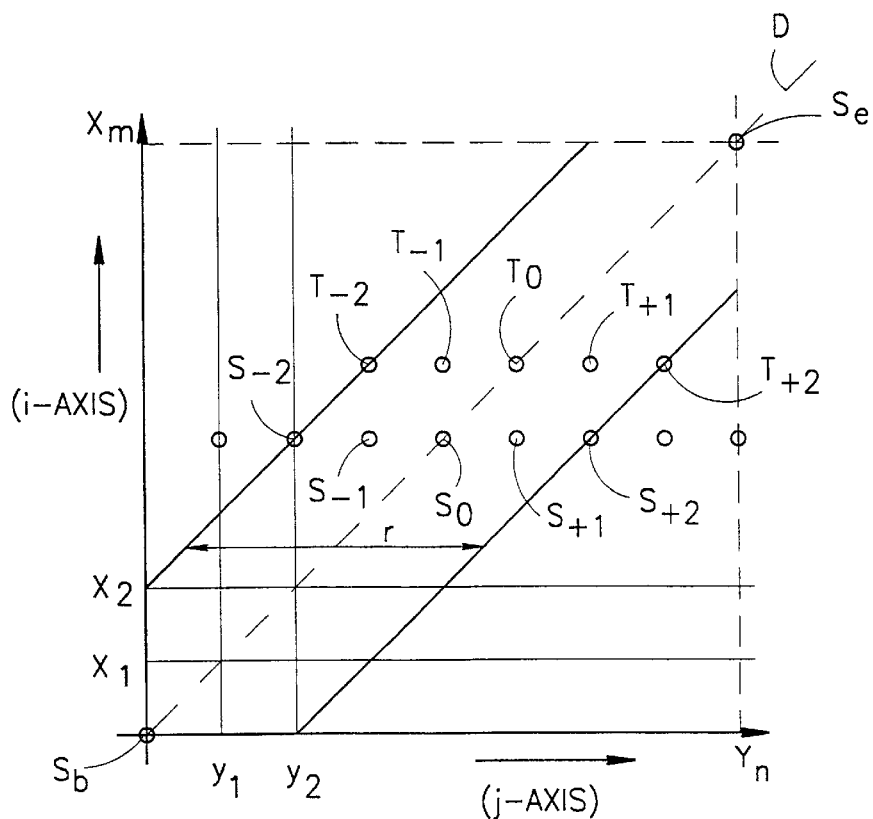
FIG. 5 is a schematic illustration of the relationship between two speech patterns X and Y, of approximately equal length, along the i-axis and j-axis, respectively.

Reference is now made to FIG. 5 which is a schematic illustration of the relationship between two audio patterns X and Y, of equal length, along i-axis and j-axis, respectively. Patterns X and Y have a sequence of frames associated with which are integer feature vectors, designated $x_1, x_2, \ldots x_m$ and $y_1, y_2, \ldots y_n$, respectively. FIG. 5 is useful for understanding the operation of the DTW unit 56 and is similar to FIG. 2.

For identical speech patterns, that is, where timing differences do not exist, the warping function F coincides with a 45 degree diagonal line D (where x=y). The warping function approximates to the 45 degree diagonal line D. The DTW unit of the present invention scans row by row through a swath of width r.

In the present invention, the points in a scan row are labeled $S_p$ where p is defined by:

$$-r/2 \leq p \leq +r/2 \qquad (4)$$

Thus, for example, for a swath width of r=5, p is −2, −1, 0, +1 or +2. Thus, each line contains five points, designated $S_{-2}, S_{-1}, S_0, S_{+1}$ and $S_{+2}$, centered about point $S_0$ which lies on the ideal diagonal line D. The beginning and end of the path through space of FIG. 5 are represented by Sb and Se and also lie on diagonal line D.

It is a feature of some preferred embodiments of the present invention that DTW unit 56 measures the spectral distance between the test pattern X and the reference pattern Y by calculating the best path value $S_p$ at each point centered about $S_0$.

As hereinbefore described with respect to the prior art, weightings can be applied to the distance measurements. Any weighing formulation can be utilized. A weight Wij is applied to the indirect paths and a weight of 2Wij is applied to the direct path.

It is noted that since p is centered about the diagonal line D, j=i+p.

At point $T_0$, the path values which are used for calculating the best value at $T_0$ are along direct path $S_0$ and indirect paths, $T_{-1}$ and $S_{+1}$. Similarly, at point $T_{+1}$, the path values which are used for calculating the best value at $T_{+1}$ are $T_0$, $S_{+1}$ and $S_{+2}$. Thus, at point $T_0$, the path values which need to be retained for calculating subsequent best values are $S_0$, $S_{+1}$, $S_{+2}$, $T_{-2}$ and $T_{-1}$.

It is noted that, in the case of some preferred embodiments of the present invention, once the best path value for $T_0$ is calculated, the value $S_0$ is no longer required and the value $T_0$ can be stored 'in place' of $S_0$. Thus, at point $T_{+1}$, the path values which are required for calculating the best value can be rewritten as $S_0, S_{+1}$ and $S_{+2}$ where $S_0$ is the 'new' value which equals the value for $T_0$. Similarly, the values $T_{-1}$ and $T_{-2}$ are stored 'in place' of $S_{-2}$ and $S_{-1}$, respectively. The final value of $S_0$ for endpoint Se yields the required path value for the test pattern X, vis-à-vis the reference pattern Y.

The above description can be written recursively as an equation:

$$S_p = \min \begin{matrix} (S_p + 2W_{i,i+p}, \\ S_{p-1} + 2W_{x,x+p}, \\ S_{p+1} + 2W_{x,x+p}) \end{matrix} \qquad (5)$$

For test audio pattern X, having a length m, the best path value $S_k$ to arrive at any point $S_{x,y}$ for x=1 . . . m, is the minimum distance of three possibilities. Points outside the swath, that is, for k>r+2 or k<k−2, are considered to be infinitely far away.

In summary, the only values which need to be stored for subsequent calculations of best path values are the path values for $S_{-2}$, $S_{-1}$, $S_0$, $S_{+1}$ and $S_{+2}$.

Figure 6:
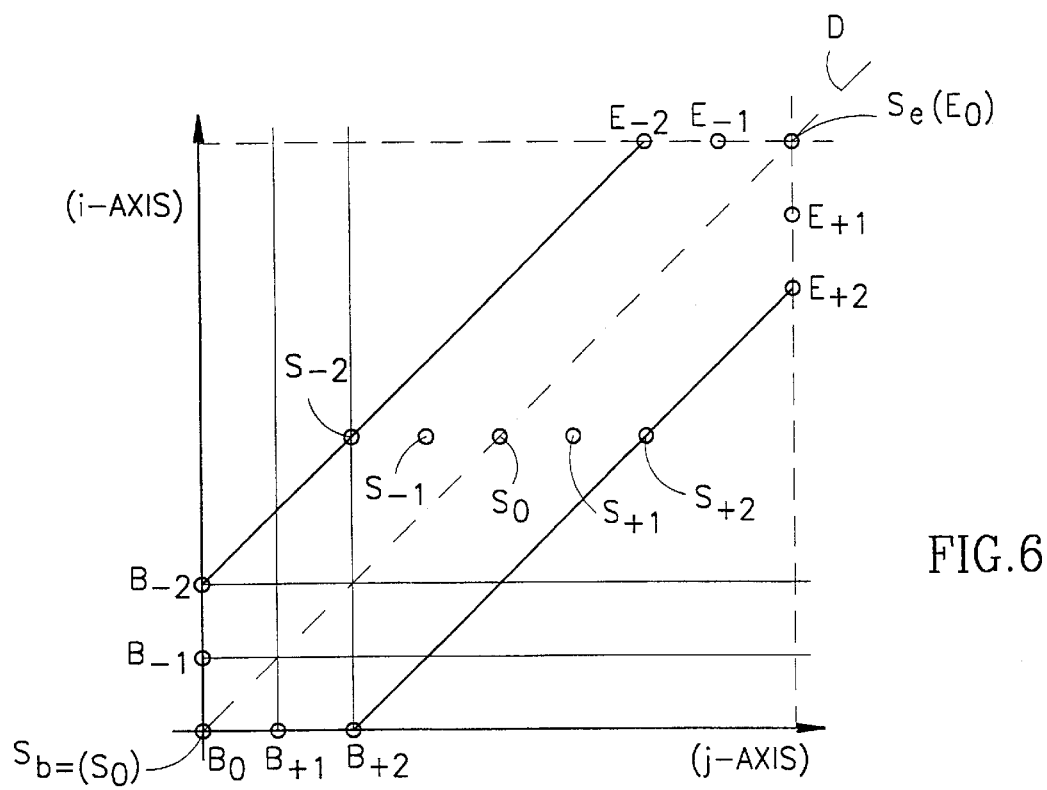
FIG. 6 is a schematic illustration detail of the end and start points, between two speech patterns X and Y, respectively.

Reference is now made to FIG. 6 which schematically details the end and start points, Se and Sb, respectively between two patterns X and Y, respectively.

The startpoint Sb which lies on the diagonal line D is assumed to have a path value So and similarly the final best value for $S_0$ coincides with endpoint Se. When endpoint Se is reached, the final five values retained ($S_{-2}$, $S_{-1}$, $S_0$, $S_{+1}$ and $S_{+2}$) refer to the five points, designated $E_{-2}$, $E_{-1}$, $E_0$, $E_{+1}$ and $E_{+2}$, along the boundary of the warping function. Since r/2=2 and the warping function follows a 45 degree line, the last row only contains the path values $E_{-2}$, $E_{-1}$ and $E_0$. All other points in the row would have to utilize points outside the swath, which is not allowed. The previous row retains the value of $E_{+1}$, which have not been overwritten, since the new path values for the last row are outside the swath. Similarly, the value stored in $E_{+2}$ refers to the second to last row.

Since the endpoint detector 62 may have incorrectly selected the endpoints of the audio pattern, the start and end points, Sb and Se, respectively, are not necessarily correct. Therefore, even if the startpoint Sb is known, the final value of $S_0$ corresponding with endpoint Se may not accurately reflect the end point and may not have the best path value.

If the endpoint Se is known and the startpoint Sb is unknown, the best path value process, described hereinabove, can be carried out in reverse. Thus, the final path value for Sb is the best of the five boundary values $B_{-2}$, $B_{-1}$, $B_0$, $B_{+1}$ and $B_{+2}$, illustrated.

If the best overall path value is found to be $E_{+1}$, for example, the assumed length for the test pattern is shorter than previously and thus is not equal in length to the reference pattern. Thus, the path values for $E_{-2}$, $E_{-1}$, $E_0$, $E_{+1}$ and $E_{+2}$ are preferably normalized by their path lengths before being compared.

If neither start nor end points are known, the startpoint Sb is preferably assumed with a value $S_0$ and the final best path value (one of the five values $E_{-2}$, $E_{-1}$, $E_0$, $E_{+1}$ and $E_{+2}$) is found. The point having the best total path value is then taken as the startpoint and the process carried out in reverse to find the best path value for Sb. Therefore, in accordance with the present invention, the path value for the reference pattern is the best path value from among the boundary path values $B_{-2}$, $B_{-1}$, $B_0$, $B_{+1}$ and $B_{+2}$.

Figure 7:
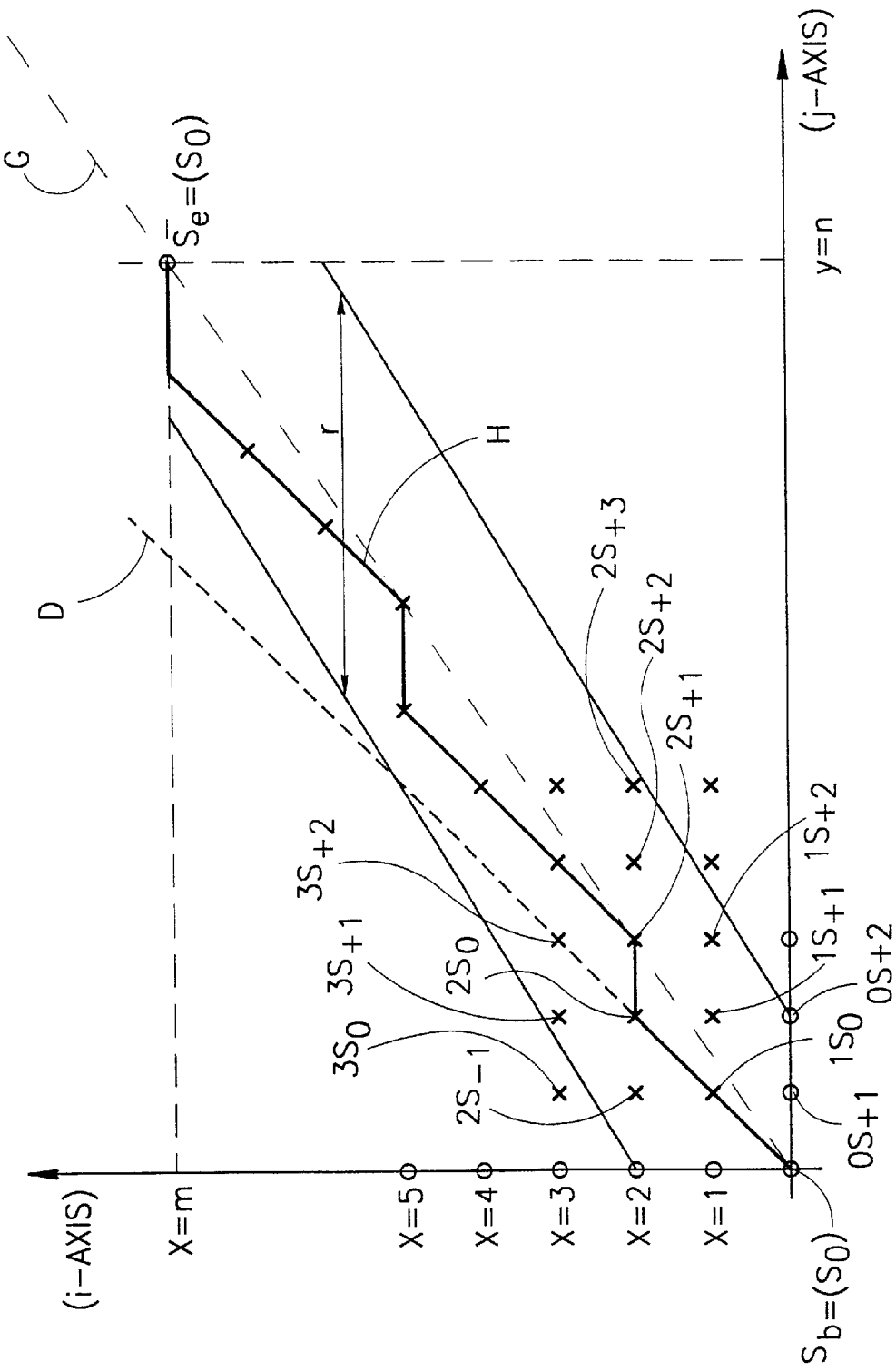
FIG. 7 is a schematic illustration of the relationship between two speech patterns X and Y, of unequal lengths.

Reference is now made to FIG. 7 which is a schematic illustration of the relationship between two audio patterns X and Y, of unequal length, along the i-axis and j-axis, respectively. The relationship between the lengths of X and Y is shown, for example, as being 8:12 (2:3). That is pattern Y is 1.5 times longer than pattern X.

For non-identical speech patterns, the straight line G, connecting the start and end points Sb and Se, respectively, does not coincide with the 45 degree diagonal line D, shown dashed. In the example of FIG. 7, path values coincide with line G only every third row. That is, points i=2, j=3 and i=5, j=7 lie on line G.

The path values $S_{-2}$, $S_{-1}$, $S_0$, $S_{+1}$ and $S_{+2}$ are shown for each of rows x=1, x=2 and x=3. Each group of path values is designated with a prefix indicating the row, such as the prefix "1" for x=1. Thus, path values $1S_{-2}$, $1S_{-1}$, $1S_0$, $1S_{+1}$ and $1S_{+2}$ refer to the row x=1.

The best path value process is carried out as described hereinbefore for patterns of equal length. Thus, startpoint Sb assumes a value of $S_0$. Values are calculated for each row. Every z rows, where z=n/(n-m), it is necessary to adjust for the inequality of the test pattern lengths. In the example, where z=3{12/(12-8)}, an extra path value $S_{+3}$ is calculated every third row. Thus, for the first two rows (x=0 and x=1), the five Sk values ($S_{-2}$, $S_{-1}$, $S_0$, $S_{+1}$ and $S_{+2}$) are calculated, as hereinbefore described. For the third row, an extra value for $2S_{+3}$ is calculated. Then value $2S_{-2}$ is discarded and the value for $2S_{-1}$ is stored 'in place' of $2S_{-2}$. Similarly, each of the stored values, $2S_0$, $2S_{+1}$, $2S_{+2}$ and $2S_{+3}$ are stored 'in place' of their neighbors, $2S_{-1}$, $2S_0$, $2S_{+1}$ and $2S_{+2}$, respectively.

Every z rows, the path value stored in $S_0$ 'jumps' back on track and coincides with the straight line G. Thus, in the example, a 'jump' is made on rows x=2, x=5 and final row x=8. The final value of $S_0$ will then coincide with the endpoint Se and yield the total path value for the two patterns.

The path values for patterns of unequal length may be represented by the following equation:

$$S_k = \min \begin{matrix} (S_k + 2W_{x,x+k-l}, \\ S_{k-1} + 2W_{x,x+k+l}, \\ S_{k+1} + 2W_{x,x+k+l}) \end{matrix} \qquad (6)$$

where: l=number of 'jumps' performed to date, which is updated every z rows and z=n/(n-m).

The track of the path value $S_0$ is shown by double line H.

Referring back to FIG. 5, in some preferred embodiments of the invention, some limitations on the swath are relaxed. In one preferred embodiment of the invention, starting point Sb and/or ending point Se are not restricted to corners of the graph rectangle. In one example, Sb may coincide with any of $X_1$, $X_2$, $Y_1$ and $Y_2$. Alternatively or additionally, Sb may coincide with points outside the swath. Alternatively or additionally, Se may coincide with any of $E_{-1}$, $E_{-2}$, $E_{+1}$ and $E_{+2}$, or even with points outside the swath.

Thus, matching between a test sequence and a plurality of reference sequences is not restricted by an apriori decision on the location of sequence boundaries. Rather, matching between sequences may succeed even if the word boundaries (in speech recognition) were not correctly identified and/or if some speech features are totally missing from the reference and/or tested sequences.

One possible artifact is that shorter paths, such as a diagonal connecting $Y_2$ and $E_{+2}$ may be artificially preferred over longer, more correct paths. In a preferred embodiment of the invention, starting and/or ending point other than at the corners of the rectangle are positionally weighted to compensate for the possibly shorter paths. Such positional weighting may be fixed. Alternatively or additionally, the positional weighting may depend on the actual path taken, and be dynamically calculated. For example, for a long path from $Y_2$ to $E_{-2}$, positional weights will be lower than for a short path between $Y_2$ and $E_{+2}$. In a preferred embodiment of the invention, the positional weights at points Sb and /or Se are adjusted to compensate for an un-taken path from Sb to $B_0$ and/or from Se to $E_0$. Although the path length may be pre-compensated by the positional weight, in a preferred embodiment of the invention, a length of a shortest path traversed so far is stored additionally or alternatively to the length of a longest path, during the wavefront propagation.

In the embodiment described with reference to FIGS. 5 and 6, it is sometimes necessary to backtrack from Se back to Sb, to confirm that Sb coincides with a corner of the rectangle. However, in the present embodiment, since Sb may legitimately be located at point other than the corner of the rectangle, and such location is already compensated by the positional weighting, such backtracking is preferably not required.

Alternatively or additionally, to only the end points being flexibly located, also the borders of the swath itself may be relaxed. In a preferred embodiment of the invention, points outside the swath are assigned a large, but not infinite weight. Thus, the number of points which need to be remembered each step may not be limited by the swath width.

Alternatively or additionally, also points inside the swath may be assigned different positional weights, preferably in conjunction with defining a wider swath. As a result, in some preferred embodiments of the invention, the swath may have non-straight borders. Thus, absent all other considerations (such as the weight of the matching of two sequence elements), a lowest positional-weight path between Sb and Se may not coincide with the diagonal. Further, the center of the swath and/or the lowest positional weight path may not be straight lines, if the positional weights are appropriately distributed. In some preferred embodiments of the invention, positional weights at points in the rectangular graph may be dynamically determined, for example, based on the path and/or on the last point traversed.

Alternatively or additionally, in some preferred embodiments of the invention, the swath may be defined around a line which does not connect the lower left corner with the upper right corner. For example, a swath of width 5 may be defined centered around the diagonal connecting $X_2$ and $E_{+2}$.

Alternatively or additionally, in some preferred embodiments of the invention, the instantaneously stored values ($S_{-2} \ldots S_{+2}$) are not necessarily on a single row. In some embodiments of the invention the values are on a single column. Alternatively or additionally, the stored values represent a propagating wavefront from the start point Sb to the end point Se. Thus, fewer or more points may be required, depending on the shape of the wave front. In one example, the wave front is perpendicular to the diagonal. In another example, the points do not form a straight line, for example, the points may form the shape of an arc.

It should be appreciated that while the above preferred embodiments have been described as utilizing a rectangular graph, such a graph is not required. In particular, since only two rows of values need to be stored in some preferred embodiments of the invention, an entire graph and/or representation of the mapping between the two sequences may never be generated and/or maintained.

As will be appreciated by persons knowledgeable in the art, the various embodiments hereinbefore referred to, are given by way of example only and do not in any way limit the present invention.

Those skilled in the art will be readily appreciate that various changes, modifications and variations may be applied to the preferred embodiments without departing from the scope of the invention as defined in and by the appended claims.

What is claimed is:

1. A method of determining a value of lowest-weight path of a mapping between two sequences, comprising:
   determining a first mapping wavefront, comprising a plurality of mapping points, each mapping point corresponding to a mapping between one data-point of one sequence of said two sequences and one data-point of another of said two sequences, each mapping point having associated therewith a value;
   propagating the wavefront to a second plurality of mapping points;
   determining a value associated with each of said second plurality of mapping points, responsive to values associated with said first mapping wavefront and to mapping weights determined by said first plurality of mapping points and by said second plurality of mapping points;
   propagating the wavefront to a third plurality of mapping points;
   determining a value associated with each of said second plurality of mapping points, responsive to values associated with a previous mapping wavefront and to mapping weights determined by a plurality of mapping points associated with said previous wavefront and by said third plurality of mapping points; and
   re-propagating the wave front to a fourth plurality of mapping points while retaining in a memory only values of mapping points associated with a limited number of previous wavefronts, wherein said limited number is significantly smaller than a number of data points in a shorter one of said two sequences.

2. A method according to claim 1, wherein determining a first mapping wave front comprises:
   setting up at least one initial mapping point; and
   propagating a wavefront from said at least one initial mapping point to said first mapping wavefront.

3. A method according to claim 2, wherein a mapping weight for determining a value of a mapping point of a current wavefront is a function of a mapping between a portion of one of said sequences and a portion of a second one of said sequences, wherein said portions are determined by a mapping between said two sequences, which mapping is associated with a pair of mapping points, one in the current wavefront and one in a previous wavefront.

4. A method according to claim 3, wherein a value for a mapping point in a current wavefront is determined as a minimum of a sum of a value of a previous mapping point in a previous wavefront and a mapping weight associated with a pair of mapping points comprising the current mapping point and the previous mapping point,
   wherein such a sum is determined initially for at least two previous wavefront mapping points for each current wavefront mapping point, providing such two previous points exist.

5. A method according to claim 4, wherein said pairs of mapping points are limited to a subset of all possible pairs, based on distance between mapping points comprising the pairs.

6. A method according to claim 5, wherein said at least one initial point comprises a single initial point.

7. A method according to claim 5, wherein said at least one initial point comprises a plurality of initial points.

8. A method according to claim 7, wherein each of said plurality of initial points has a value associated therewith.

9. A method according to claim 8, wherein said value is large for initial points which do not represent a mapping between initial datapoints of said two sequences.

10. A method according to claim 5, wherein re-propagating said wavefront comprises re-propagating said wavefront until all datapoints of at least one of said sequences is mapped to datapoints of the other of said sequences, at a last wavefront.

11. A method according to claim 10, wherein said last wavefront includes a corner mapping point which maps a final data point of one sequence to a final data point of the other sequence.

12. A method according to claim 11, comprising selecting a value associated with said corner mapping point as said determined value of a lowest-weight path.

13. A method according to claim 11, comprising selecting a minimum value, over at least two mapping points in said last wavefront, as said determined value of a lowest-weight path.

14. A method according to claim 13, wherein said values of said mapping points in said last wavefront are a function of said mapping points not being a corner mapping point.

15. A method according to claim 13, comprising weighting said values of said mapping point in said last wavefront, responsive to lengths of paths followed to reach said last wavefront.

16. A method according to claim 5, wherein said second wavefront comprises a set of mapping points, each mapping a same data point of one sequence to different data points of the other sequence.

17. A method according to claim 5, wherein said second wavefront defines a perpendicular, in a Cartesian mapping space, to a mapping line defining a one-to-one mapping between said two sequences.

18. A method according to claim 5, wherein said limited number of previous wavefronts comprises two wavefronts.

19. A method according to claim 5, wherein said limited number of previous wavefronts comprises a single wavefront.

20. A method according to claim 5, wherein said wavefront propagation is limited to a subset of all possible mapping points.

21. A method according to claim 20, wherein mapping points outside said subset of all possible mapping points are associated with infinite values.

22. A method according to claim 20, wherein a positional weight is associated with individual mapping points.

23. A method according to claim 22, wherein said value associated with a mapping point is also a function of said positional weight.

24. A method according to claim 22, wherein said positional weight is dependent on an absolute position of an individual mapping point, in a Cartesian mapping space of said sequences.

25. A method according to claim 20, wherein said limited subset is defined, in a Cartesian mapping space of said sequences, as a swath having a width r.

26. A method according to claim 25, wherein r is an odd integer.

27. A method according to claim 25, wherein said swath is centered around a diagonal in said. Cartesian mapping, connecting a mapping of initial data points of the sequences and a mapping of final data points of the sequences.

28. A method according to claim 5, wherein said two sequences comprise different numbers of data points.

29. A method according to claim 5, wherein all the data-points of said sequences are stored using a fixed point representation.

30. A method according to claim 29, wherein all the data-points of said sequences are stored using an integer representation.

* * * * *